(12) United States Patent
Liu et al.

(10) Patent No.: US 11,881,934 B2
(45) Date of Patent: *Jan. 23, 2024

(54) SYSTEMS AND METHODS FOR DETERMINING A NETWORK PATH TRACE

(71) Applicant: Cisco Technology, Inc., San Jose, CA (US)

(72) Inventors: Jianda Liu, Shanghai (CN); Xiaorong Wang, Shanghai (CN); Shen Yong Qing, Shanghai (CN); Olivier Patrick Jean Pelerin, Holsbeek (BE); Frederic René Philippe Detienne, Harze (BE); Pritam Baruah, Fremont, CA (US); Ruchir Jain, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,298

(22) Filed: Oct. 31, 2022

(65) Prior Publication Data
US 2023/0112928 A1    Apr. 13, 2023

Related U.S. Application Data

(63) Continuation of application No. 16/988,920, filed on Aug. 10, 2020, now Pat. No. 11,516,104.

(51) Int. Cl.
*H04L 12/26* (2006.01)
*H04L 43/10* (2022.01)
*H04L 43/062* (2022.01)

(52) U.S. Cl.
CPC ............ *H04L 43/10* (2013.01); *H04L 43/062* (2013.01)

(58) Field of Classification Search
None
See application file for complete search history.

(56) References Cited

U.S. PATENT DOCUMENTS 8,750,288 B2   6/2014 Nakil et al.
9,374,304 B2   6/2016 Solis et al.
(Continued)

FOREIGN PATENT DOCUMENTS

WO   WO-2015005968 A1 *  1/2015  ......... H04L 12/4633
WO       2015119611 A2     8/2015
(Continued)

OTHER PUBLICATIONS

PCT Notification of Transmittal of the Intl. Search Report and the Written Opinion of the Intl. Searching Authority, or the Declaration, PCT/US2021/043262 dated Oct. 25, 2021.

*Primary Examiner* — Natisha D Cox
(74) *Attorney, Agent, or Firm* — Baker Botts L.L.P.

(57) ABSTRACT

In one embodiment, a method includes receiving, by a network orchestrator, trace parameters from a user device. The method also includes determining, by the network orchestrator, to initiate a network path trace for the application, generating, by the network orchestrator, a filter policy for the network path trace using the trace parameters, and allocating, by the network orchestrator, a trace identification to the network path trace. The method also includes initiating, by the network orchestrator, the network path trace within a network by communicating the filter policy and the trace identification to a first node of the network and receiving, by the network orchestrator, network path trace data from a plurality of nodes of the network. The method further includes generating, by the network orchestrator, a trace report for the application using the network path trace data.

20 Claims, 6 Drawing Sheets

(56) References Cited

U.S. PATENT DOCUMENTS

| | | | |
|---|---|---|---|
| 9,553,780 B1 | 1/2017 | Bullukian et al. | |
| 9,705,575 B2 | 6/2017 | Nam et al. | |
| 9,755,969 B2 | 9/2017 | Agarwal | |
| 2015/0244617 A1* | 8/2015 | Nakil | H04L 41/0897 709/224 |
| 2015/0281036 A1* | 10/2015 | Sun | H04L 41/14 370/248 |
| 2020/0044931 A1 | 2/2020 | Boon | |
| 2021/0058306 A1 | 2/2021 | Szigeti et al. | |

FOREIGN PATENT DOCUMENTS

| | | | | |
|---|---|---|---|---|
| WO | WO-2015119611 A2 * | 8/2015 | ......... | H04L 12/6418 |
| WO | 2018046988 A1 | 3/2018 | | |
| WO | 2019043435 A1 | 3/2019 | | |
| WO | WO-2019043435 A1 * | 3/2019 | ......... | G06F 9/45558 |

* cited by examiner

UI Page 200

Trace Parameters 180:
- Site ID*: 500
- VPN*: VPN-1
- Host IP: 111.111.1.11
- Destination IP/FQDN: cisco.webex.com
- Application: webex-meeting
- Trace Duration (seconds): 300

Advanced options 210:
- Device
- Source Interface
- Protocol
- Source Port
- Destination Port
- DSCP
- ☑ FIA trace
- ☑ Packet Copy Debug Level 220:
- trace all packets
- choose/reset selections
- trace all packets
- trace drop packets only
- trace statistics only ⓘ Note: Please specify Parameters for first hop router

[Start] [Stop]

Search Options ▸

Historical Tracing Results 230:

| Time | VPN | Site ID | Host IP | Destination IP/FQDN | Application | Trace Duration (seconds) | Link to Result |
|---|---|---|---|---|---|---|---|
| 21 Mar 2019 1:19:42 PM CST | VPN-1 | 500 | 111.111.1.11 | cisco.webex.com | webex-meeting | 300 | Tracing Result |
| 21 Mar 2019 2:29:32 PM CST | VPN-1 | 500 | Not Specified | Not Specified | bittorrent | 100 | Tracing Result |
| 28 Nov 2018 4:51:29 PM CST | VPN-1 | 500 | 10.0.2.7 | Not Specified | Not Specified | 257 | Tracing Result |
| 28 Nov 2019 4:41:47 PM CST | VPN-1 | 500 | Not Specified | www.office.com | Not Specified | 58 | Tracing Result |

*FIG. 2*

| Site ID* | VPN* | Host IP | Destination IP/FQDN | Application | Trace Duration (seconds) |
|---|---|---|---|---|---|
| 500 ▼ | VPN-1 ▼ | 111.111.1.11 ▼ | cisco.webex.com ▼ | webex-meeting ▼ | 300 ▼ |

Advanced Options >

🔍 [Search Options ▼]    [Start] [Stop]

| Global Flows | Local Edge | Local Color | Remote Edge | Remote Color | Local Drop Rate | WAN Drop Rate | Remote Drop Rate | Jitter (ms) | Latency (ms) | Total Packets | Total Bytes |
|---|---|---|---|---|---|---|---|---|---|---|---|
| ∨ Flow ID 1, 111.111.1.11:4567, 66.666.666:35462, TCP | — | — | — | — | — | — | — | — | — | — | — |
| Upstream Hop 1 | vm5 ⓘ Detail | LTE | vm1 ⓘ Detail | LTE | 1.05% | 2.07% | 0.0% | 1.01 | 1.00 | 351 | 2.84 KB |
| Downstream: Hop 1 | vm1 ⓘ Detail | LTE | vm5 ⓘ Detail | LTE | 0.0% | 1.93% | 0.03% | 1.00 | 0.85 | 577 | 6.12 KB |
| ∨ Flow ID 87, 111.111.1.11:3333, 66.666.666:44444, TCP | — | — | — | — | — | — | — | — | — | — | — |
| Upstream Hop 1 | vm5 ⓘ Detail | LTE | vm1 ⓘ Detail | LTE | 1.05% | 2.07% | 0.0% | 1.01 | 1.00 | 234 | 2.84 KB |
| Upstream: Hop 2 | vm1 ⓘ Detail | 3g | vm5 ⓘ Detail | 3g | 0.0% | 0.0% | 0.0% | 1.01 | 1.00 | 234 | 2.84 KB |
| Downstream: Hop 1 | vm5 ⓘ Detail | 3g | vm1 ⓘ Detail | 3g | 0.0% | 0.0% | 0.0% | 1.00 | 1.00 | 612 | 6.12 KB |
| Downstream: Hop 2 | vm1 ⓘ Detail | LTE | vm5 ⓘ Detail | LTE | 0.0% | 1.93% | 0.03% | 1.00 | 0.85 | 612 | 6.12 KB |
| > Flow ID 235, 111.111.1.11:29567, 66.666.666:15427, UDP | — | — | — | — | — | — | — | — | — | — | — |
| > Flow ID 4213, 111.111.1.11:9367, 66.666.666:62427, UDP | — | — | — | — | — | — | — | — | — | — | — |

UI Page 300

Trace Parameters 180
Advanced options 210
Trace Report 188

SYSTEMS AND METHODS FOR DETERMINING A NETWORK PATH TRACE

PRIORITY

This nonprovisional application is a continuation, under 35 U.S.C. § 120, of U.S. patent application Ser. No. 16/988,920 filed on Aug. 10, 2020, and entitled "Systems and Methods for Determining a Network Path Trace" all of which is hereby incorporated by reference in its entirety.

TECHNICAL FIELD

The present disclosure relates generally to network path traces, and more specifically to systems and methods for determining a network path trace.

BACKGROUND

Existing flow analysis engines analyze data about traffic flows traversing a network. Certain flow analysis engines are unaware of which network paths certain application flows will traverse. To accurately analyze network-wide flows, these flow analysis engines may push a filter policy to the entire network, which presents a challenge in scale and results in overhead to normal usage. Other flow analysis engines use flow information to simulate a flow's potential network path based on routing and switching information received from a device, which requires the user of the device to know the detailed information of the flow in advance.

BRIEF DESCRIPTION OF THE DRAWINGS

FIG. 2 illustrates an example user interface page for inputting trace parameters that may be used by the system of FIG. 1;

FIG. 3 illustrates an example user interface page for displaying a trace report that may be used by the system of FIG. 1;

FIG. 4 illustrates an example user interface page for displaying details of the trace report of FIG. 3;

DESCRIPTION OF EXAMPLE EMBODIMENTS

Overview

Figure 1:
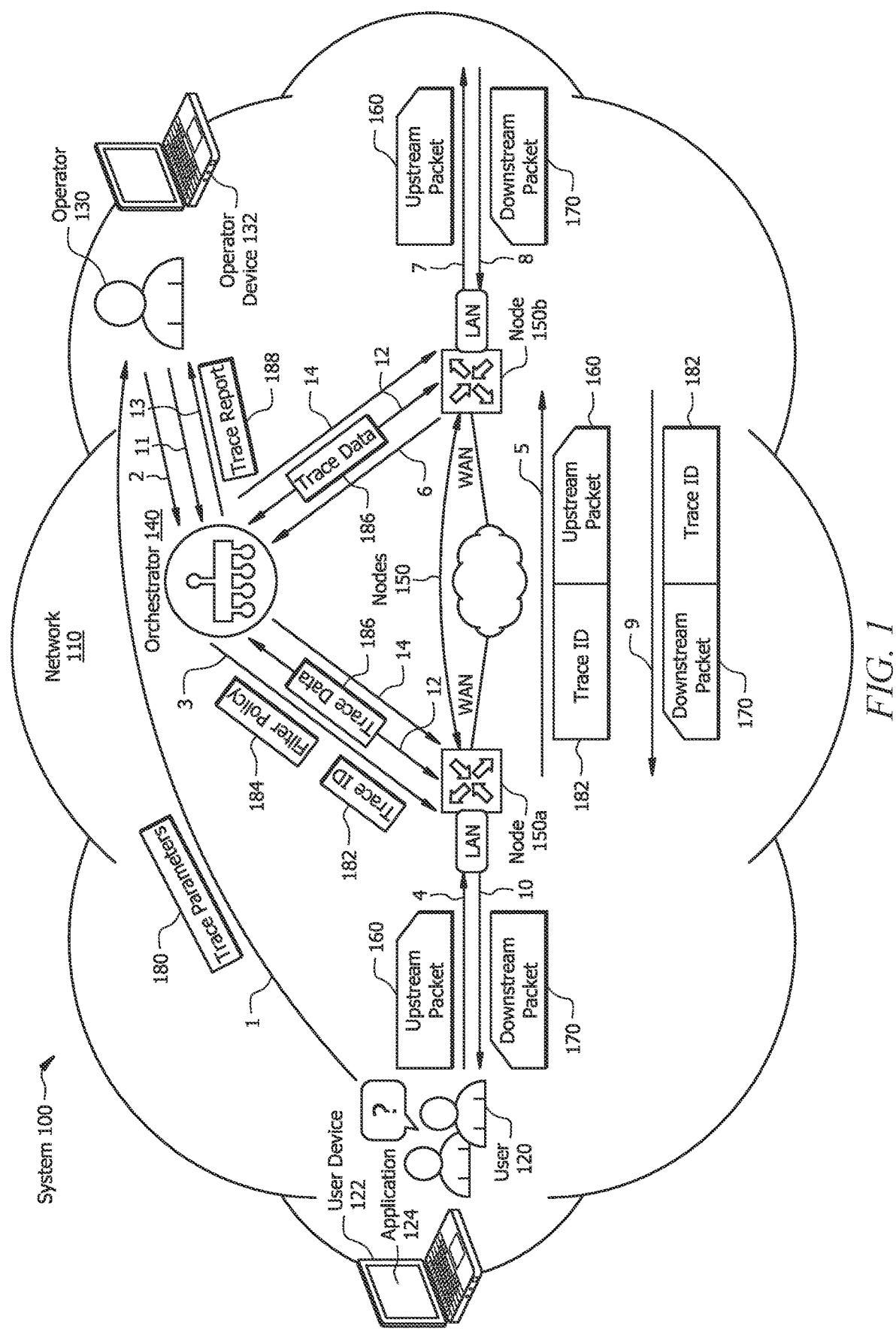
FIG. 1 illustrates an example system for determining a network path trace.

According to an embodiment, a network orchestrator includes one or more processors and one or more computer-readable non-transitory storage media coupled to the one or more processors. The one or more computer-readable non-transitory storage media include instructions that, when executed by the one or more processors, cause the network orchestrator to perform operations including receiving trace parameters from a user device. The trace parameters may be associated with an application. The operations also include determining to initiate a network path trace for the application, generating a filter policy for the network path trace using the trace parameters, and allocating a trace identification to the network path trace. The operations also include initiating the network path trace within a network by communicating the filter policy and the trace identification to a first node of the network and receiving network path trace data from a plurality of nodes of the network. The plurality of nodes of the network include the first node. The operations further include generating a trace report for the application using the network path trace data.

In some embodiments, the trace report includes a bi-directional flow path within the network. In certain embodiments, the trace parameters include at least two selected from the group of: a site identification; a virtual private network (VPN) identification; an Internet Protocol (IP) address of the user device; and an identification of the application. In some embodiments, the trace identification is communicated from the first node of the network to a second node of the network within metadata of a packet, and the metadata further includes at least one selected from the group of: an indication of a flow direction of the packet; a debug level for the network path trace data; and a flow identification allocated by the first node. In some embodiments, the trace report further includes at least one selected from the group of: a network path of each flow of the network path trace; a network location where each flow experienced packet drop; metrics associated with each flow; a total number of packets associated with each flow; a total number of bytes associated with each flow; a listing of the packets associated with each flow; and an internal trace result associated with each of the packets.

In certain embodiments, the operations include receiving an end trace command and communicating, in response to receiving the end trace command, a stop trace command for the network path trace to the plurality of nodes of the network. In certain embodiments, the operations include receiving the network path trace data from a trace result database located within each of the plurality of nodes of the network and initiating a cleaning procedure of the trace result database located within each of the plurality of nodes of the network. In some embodiments, the network path trace data includes flow statistics for each of the plurality of nodes of the network and an internal trace result for each packet associated with each of the plurality of nodes.

According to another embodiment, a method includes receiving, by a network orchestrator, trace parameters from a user device. The trace parameters are associated with an application. The method also includes determining, by the network orchestrator, to initiate a network path trace for the application, generating, by the network orchestrator, a filter policy for the network path trace using the trace parameters, and allocating, by the network orchestrator, a trace identification to the network path trace. The method also includes initiating, by the network orchestrator, the network path trace within a network by communicating the filter policy and the trace identification to a first node of the network and receiving, by the network orchestrator, network path trace data from a plurality of nodes of the network. The plurality of nodes of the network include the first node. The method further includes generating, by the network orchestrator, a trace report for the application using the network path trace data.

According to yet another embodiment, one or more computer-readable non-transitory storage media embody instructions that, when executed by a processor, cause the processor to perform operations including receiving trace parameters from a user device. The trace parameters may be associated with an application. The operations also include determining to initiate a network path trace for the application, generating a filter policy for the network path trace using the trace parameters, and allocating a trace identification to the network path trace. The operations also include initiating the network path trace within a network by communicating the filter policy and the trace identification to a first node of the network and receiving network path trace data from a plurality of nodes of the network. The plurality of nodes of the network include the first node. The operations further include generating a trace report for the application using the network path trace data.

Technical advantages of certain embodiments of this disclosure may include one or more of the following. Certain systems and methods described herein may be used to trace application paths in one or more networks. Certain embodiments of this disclosure include an intent-based operation system that enhances the serviceability of an SD-WAN by translating an end user's intent to trace an application for a host. The application may be traced from a VPN into a network-wide tracing of flows (e.g., unidirectional or bi-directional flows) initiated from that particular host by that particular application. The tracing result may include the network path taken by each flow in each direction, each flow's packet drop count/rate on and between each hop of the path, and a detailed feature-by-feature handling result of every packet in each flow based on an internetworking operating system (IOS) packet tracing feature (e.g., an IOS-XE packet tracing feature). This one-shot network-wide tracing result may maintain most or all of the details from the occurrence of the user application. In certain embodiments, the network-wide tracing result may be used by a network operator (e.g., a support engineer) to deterministically identify the network, policy, or product issue. Certain systems and methods described herein are applicable for SD-WAN, multi-domain cross WAN, campuses, or data centers.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Troubleshooting a network-wide application experience and validating network policies based on intent in an SD-WAN is complex. For example, the application paths may be impacted by different network elements such as a central orchestrator, a policy distributor, a network edge router, and/or an underlay network (e.g., the Internet or a Multi-protocol Label Switching (MPLS) network) connecting edge routers. As another example, the application paths may be impacted by different features such as an application route policy, a data policy, network address translation (NAT), Internet Protocol Security (IPSec), and/or quality of service (QoS). To enhance serviceability of the SD-WAN solution, an intent-based operation system is disclosed that can translate an end user's intent to trace an application for the end user's device.

Figure 4:
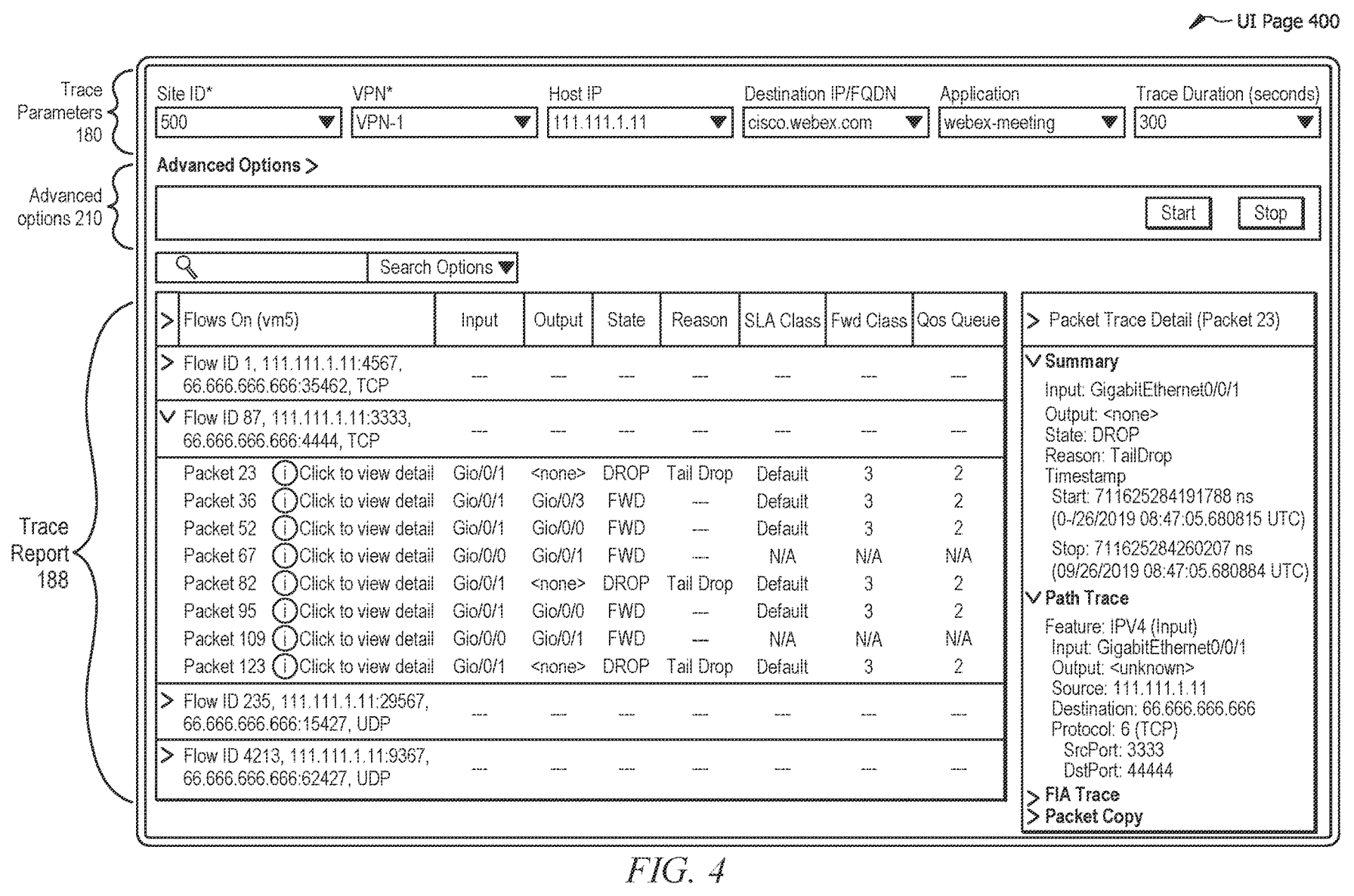
Figure 5:
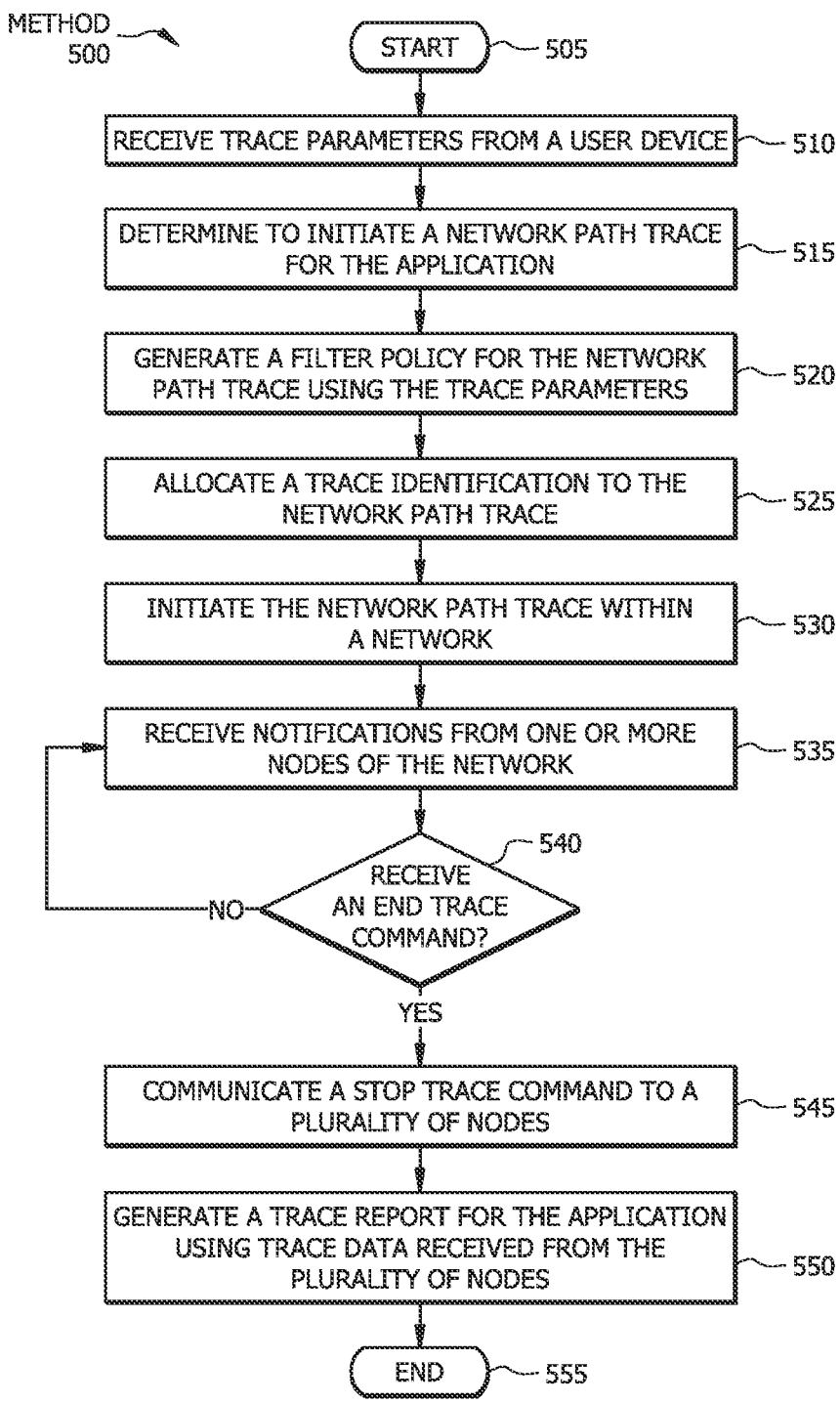
FIG. 5 illustrates an example method for determining a network path trace.
Figure 6:
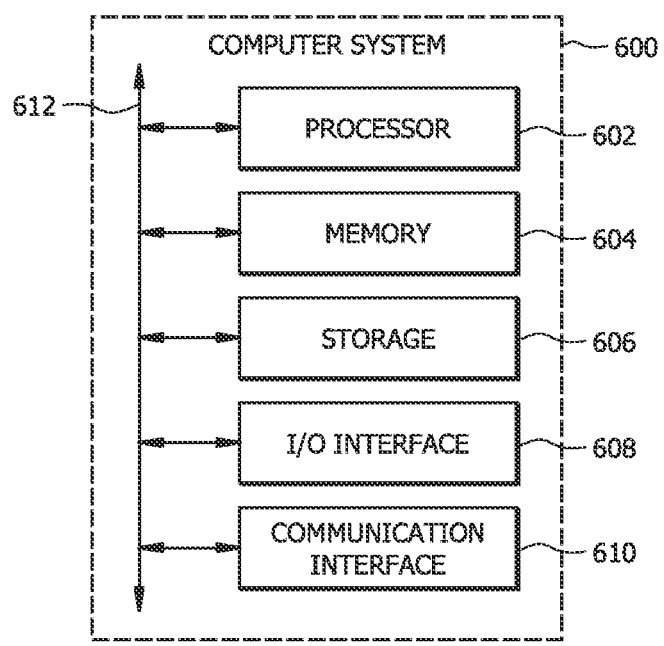
FIG. 6 illustrates an example computer system that may be used by the systems and methods described herein.

FIG. 1 shows an example system for determining a network path trace. FIG. 2 shows an example user interface page for inputting trace parameters that may be used by the system of FIG. 1, FIG. 3 shows an example user interface page for displaying a trace report that may be used by the system of FIG. 1, and FIG. 4 shows an example user interface page for displaying details of the trace report of FIG. 3. FIG. 5 shows an example method for determining a network path trace. FIG. 6 shows an example computer system that may be used by the systems and methods described herein.

FIG. 1 illustrates an example system 100 for determining a network path trace, System 100 or portions thereof may be associated with an entity, which may include any entity, such as a business or company that initiates network path traces.

The components of system 100 may include any suitable combination of hardware, firmware, and software. For example, the components of system 100 may use one or more elements of the computer system of FIG. 6. System 100 of FIG. 1 includes a network 110, a user 120, a user device 122, an application 124, an operator 130, an operator device 132, a user interface 134, an orchestrator 140, nodes 150, an upstream packet 160, a downstream packet 170, trace parameters 180, a trace identification 182, a filter policy 184, trace data 186, and a trace report 188.

Network 110 of system 100 is any type of network that facilitates communication between components of system 100. Network 110 may connect one or more components of system 100. One or more portions of network 110 may include an ad-hoc network, an intranet, an extranet, a VPN, a local area network (LAN), a wireless LAN (WLAN), a WAN, a wireless WAN (WWAN), an SD-WAN, a metropolitan area network (MAN), a portion of the Internet, a portion of the Public Switched Telephone Network (PSTN), a cellular telephone network, a DSL, a 3G network, a 4G network, a 5G network, a Long Term Evolution (LTE) network, a combination of two or more of these, or other suitable types of networks. Network 110 may include one or more different types of networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. In the illustrated embodiment of FIG. 1, network 110 includes an SD-WAN. The SD-WAN is a virtual overlay network that uses tunnels to carry traffic over multiple underlay networks. The SD-WAN may be a hybrid of existing carrier services and unmanaged connections that utilize the public Internet.

User 120 of system 100 is any individual, group of individuals, machine, entity, and the like that interacts with user device 122. User 120 may utilize user device 122 to communicate with operator 130 over network 110. In certain embodiments, user 120 of user device 122 interacts with application 124. Application 124 is a software program that runs on user device 122. Application 124 may be a video application, an audio application, a screen sharing application, a messaging application, a file sharing application, a whiteboarding application, a calling application, a web browser, an e-mail program, a word processor, a game, a combination thereof, or any other suitable application. In certain embodiments, user 120 may experience an issue with application 124 and generate a complaint regarding the performance of application 124 using user device 122.

User device 122 of system 100 represents any suitable computing component that may be used to communicate information to one or more components (e.g., operator device 132) of system 100. User device 122 may be a phone (e.g., a smartphone), a laptop computer, a desktop computer, a tablet, a personal digital assistant, a wearable computer, a combination thereof, or any other suitable computing component. In certain embodiments, user device 122 may have wireless network connection capabilities (e.g., WI-FI and/or BLUETOOTH capabilities). User device 122 may include an interface (e.g., a screen, a graphical user interface (GUI), or a panel) that allows user 120 to interact with user device 122. User device 122 may communicate with one or more components of system 100 via network 110. For example, user device 122 may communicate a complaint regarding the performance of application 124 to operator 130.

Operator 130 of system 100 is any individual, group of individuals, machine, entity, and the like that interacts with operator device 132. In certain embodiments, operator 130 is authorized by an entity (e.g., a service provider) associated with system 100 to communicate with orchestrator 140. In some embodiments, operator 130 may be requested to enter an identification associated with the entity to access orchestrator 140. Operator 130 may input information into operator device 132. For example, operator 130 may input information received from user device 122 into operator device 132.

Operator device 132 of system 100 represents any suitable computing component that may be used to process information for operator 130. Operator device 132 may be a laptop computer, a desktop computer, a phone (e.g., a smartphone), a tablet, a personal digital assistant, a wearable computer, a combination thereof, or any other suitable computing component. In certain embodiments, operator device 132 may have wireless network connection capabilities (e.g., WI-FI and/or BLUETOOTH capabilities). Operator device 132 may communicate with one or more components of system 100 via network 110. For example, operator device 132 may receive a complaint regarding the performance of application 124 from user device 122. As another example, operator device may communicate information associated with the complaint to orchestrator 140.

In certain embodiments, operator device 132 includes user interface 134 that allows operator 130 to interact with operator device 132, For example, operator 130 may receive trace parameters 180 from user device 122 and input trace parameters 180 into user interface 134 of operator device 132. Trace parameters 180 are characteristics associated with application 124 that are used to trace the flow path of application 124 through network 110. Trace parameters 180 may include a site identification, a VPN identification, an Internet Protocol (IP) address of user device 122, an identification of application 124, a trace duration, and the like. In certain embodiments, operator device 132 receives one or more trace parameters 180 within a complaint. For example, user 120 of user device 122 may generate a complaint associated with the performance of application 124 and communicate the complaint to operator device 132. Operator device 132 may then retrieve one or more trace parameters 180 (e.g., the IP address of user device 122, the identification of application 124, etc.) from the complaint. In certain embodiments, operator 130 generates one or more trace parameters 180 such as the trace duration. Operator may input one or more trace parameters 180 into user interface 134 of operator device 132. In certain embodiments, operator device 132 communicates trace parameters 180 to orchestrator 140. For example, operator 130 may select a start function on user interface 134 of operator device 132 to request a network path trace for application 124, which communicates trace parameters 180 that have been input into user interface 134 to orchestrator 140.

Orchestrator 140 of system 100 represents any suitable computing component (e.g., a controller, a router, a server, etc.) that may be used to initiate network path traces for system 100. Orchestrator 140 may coordinate one or more components of system 100 and/or facilitate communication between one or more components of system 100. Orchestrator 140 may receive data from and/or transmit data to one or more components of system 100. Orchestrator 140 may be located in any suitable location to process information for system 100. In the illustrated embodiment of FIG. 1, orchestrator 140 is located within an SD-WAN environment. In certain embodiments, orchestrator 140 serves as a central controller for network 110.

In certain embodiments, orchestrator 140 receives trace parameters 180 from one or more components of system 100. For example, user 120 of user device 122 may experience a performance issue with application 124 and communicate a complaint to operator device 132, and trace parameters 180 may be associated with that particular application 124 that is experiencing the performance issue. As another example, orchestrator 140 may receive a request from operator device 132 to verify the design of a deployment of a new site, VPN, and/or service within network 110, and trace parameters 180 may be associated with that particular new site, VPN, and/or service. As still another example, orchestrator 140 may receive a request from operator device 132 to periodically monitor policies utilized by network 110, and trace parameters 180 may be associated with the policies.

In certain embodiments, orchestrator 140 determines to initiate a network path trace. For example, orchestrator 140 may determine to initiate a network path trace for application 124 in response to receiving trace parameters 180 from operator device 132. In some embodiments, orchestrator 140 allocates trace identification 182 to the network path trace. Trace identification 182 is a network-wide unique identification that is used by one or more components of system 100 to identify a particular network path trace. Trace identification 182 may be carried by one or more packets within network 110. In some embodiments, orchestrator 140 generates filter policy 184 for the network path trace. Filter policy 184 is a policy used by components of system 100 to filter packets within network 110 that belong to application 124. In certain embodiments, orchestrator 140 translates trace parameters 180 to generate filter policy 184. In some embodiments, orchestrator initiates the network path trace for application 124 by communicating trace identification 182 and/or filter policy 184 to node 150.

Nodes 150 of system 100 represent any suitable computing components (e.g., routers, switches, servers, etc.) that can receive, create, process, store, and/or send traffic to other components within network 110. Network 110 of system 100 may include a plurality of nodes 150. In certain embodiments, nodes 150 are part of an SD-WAN architecture. In the illustrated embodiment of FIG. 1, nodes 150 include node 150a and node 150b.

Node 150a is a device (e.g., a first hop device) within the SD-WAN architecture of network 110 that is nearest to the location of user device 122. Node 150a may receive packets from and/or communicate packets to user device 122 using a LAN connection of network 110. Node 150a may receive packets from and/or communicate packets to node 150b using a WAN connection of network 110. In certain embodiments, node 150a receives information from orchestrator 140. For example, node 150a may receive trace identification 182 and/or filter policy 184 from orchestrator 140. Upon receiving filter policy 184 from orchestrator 140, node 150a may activate filter policy 184 for the network path trace identified by trace identification 182.

In certain embodiments, when filter policy 184 for the network path trace identified by trace identification 182 is activated on node 150a, node 150a matches upstream packet 160 received from user device 122 to the filter of filter policy 184, Upstream packet 160 is a collection of data that is communicated from user device 122 to one or more components of network 110. Node 150a may search for an existing flow using the tuple of upstream packet 160 and create a new flow entry if no existing flow is discovered. Upon creating a new flow entry, a per trace unique flow identification is allocated for the new flow. Node 150*a* may trace the internal code path of upstream packet 160 and save the internal trace result on node 150*a* using trace identification 182, the flow identification, and the arriving order of upstream packet 160 as three levels of indexes.

When node 150*a* finishes processing upstream packet 160, node 150*a* may add metadata to the overlay encapsulation. The metadata may include one or more of the following fields: a direction bit, which is used to mark a flow direction (e.g., 0 for upstream and 1 for downstream); a debug level, which is used to indicate the debug level of the network path trace; a flag, which is reserved for future use; a flow identification, which is allocated by node 150*a* to represent the flow globally; and trace identification 182, which is allocated by orchestrator 140. In certain embodiments, node 150*a* initiates an encapsulation procedure to encapsulate the metadata of upstream packet 160. After encapsulating the metadata, node 150*a* may communicate upstream packet 160 to node 150*b*.

Node 150*b* is a remote device within the SD-WAN architecture of network 110. Node 150*b* may receive packets from and/or communicate packets to a device external to the SD-WAN architecture of network 110 using a LAN connection. Node 150*b* may receive packets from and/or communicate packets to node 150*a* using a WAN connection of network 110. In certain embodiments, node 150*b* is located in a different geographical region than node 150*a*. For example, node 150*b* may be located in a first city (e.g., Beijing, San Jose, etc.), and node 150*a* may be located in second city (e.g., Shanghai, New York City, etc.). Node 150*b* may receive upstream packet 160 from node 150*a*. In certain embodiments, upon receiving upstream packet 160, node 150*b* decapsulates the metadata, reads trace identification 182 from the decapsulated metadata, and/or searches trace identification 182 in a trace result database. If node 150*b* is unable to find a match for trace identification 182 in the trace result database, node 150*b* may insert trace identification 182 into the trace result database. In certain embodiments, node 150*b* communicates a notification to orchestrator 140. The notification may include information associated with node 150*b* (e.g., a device identification), trace identification 182, etc. The information included in the notification may indicate to orchestrator 140 that a database record for trace identification 182 is available on node 150*b*. Upon receiving this notification from node 150*b*, orchestrator 140 may use the information to determine the external network path of traced upstream packet 160.

Upon receiving upstream packet 160 with the metadata added by node 150*a*, node 150*b* may determine to internally trace upstream packet 160. In certain embodiments, node 150*b* saves the internal trace result of upstream packet 160 and indexes upstream packet 160 by trace identification 182 and/or the flow identification. Node 150*b* may read the arriving order of upstream packet 160 from the metadata. In certain embodiments, node 150*b* searches for the existing flow using the tuple of upstream packet 160. Node 150*b* may create a new flow entry if no existing flow entry is discovered. The flow entry created by node 150*b* may be bi-directional such that an automatic filter to match the existing flow entries may be created on the network domain edge interfaces to match downstream packets coming from outside of this network domain. Trace identification 182 and/or flow identification may be saved into the flow entry opaque data.

Node 150*b* may receive downstream packet 170 from a node (e.g., a web server) outside of network 110. Downstream packet 170 is a collection of data that is communicated from one or more components of network 110 (e.g., node 150*b*) to user device 122, In certain embodiments, node 150*b* may use the automatic filter to determine that downstream packet 170 matches an existing flow. In response to this determination, node 150*b* may initiate a trace for downstream packet 170. Trace identification 182 and/or the flow identification may be obtained from the matching flow entry's opaque data and used together with the arriving order of downstream packet 170 to index the internal trace result of downstream packet 170. Trace identification 182 and/or the flow identification may be included in the metadata fields of downstream packet 170 once downstream packet 170 proceeds to the overlay encapsulation procedure.

Node 150*b* may communicate downstream packet 170 to node 150*a* with trace identification 182 and/or the flow identification in the metadata. Node 150*b* sets the direction bit in the metadata of downstream packet 170 to downstream (e.g., 1 for downstream), When node 150*a* receives downstream packet 170 from node 150*b*, node 150*a* may determine that downstream packet 170 is downstream by reading its metadata. As such, node 150*a* traces downstream packet 170 and saves the trace results; no other actions may be required for downstream packet 170.

In certain embodiments, operator 130 may issue, via operator device 132, an end trace command to orchestrator 140 to request orchestrator 140 to terminate the network path trace for application 124. Upon receiving the end trace command from operator device 132, orchestrator 140 communicates a stop trace command to participating nodes 150 (e.g., node 150*a* and node 150*b*) of network 110 that have a trace result database record for trace identification 182. In certain embodiments, orchestrator 140 may communicate the stop trace command to participating nodes 150 in response to determining to end the network path trace based on a configurable interval timer. Upon receiving the stop trace command, nodes 150 may remove all filters (including those configured on node 150*a* and those automatically generated on node 150*b*) so that no new packets are matched and traced. A predetermined period of time may be allowed for orchestrator 140 to receive the in-flight traced packets and/or to obtain the internal trace results from participating nodes 150.

In some embodiments, filter policy 184 is configured to instruct one or more participating nodes 150 of network 110 to terminate the network path trace for application 124. For example, filter policy 184 may include a parameter that initiates the termination of the network path trace once node 150*a* filters a predetermined number of packets (e.g., 1 to 250 packets) in accordance with filter policy 184. In response to node 150*a* filtering the predetermined number of packets, participating nodes 150 may remove all filters (including those configured on node 150*a* and those automatically generated on node 150*b*) so that no new packets are matched and traced.

In certain embodiments, orchestrator 140 receives trace data 186 associated with trace identification 182 from nodes 150 of network 110. Trace data 186 is data received from participating nodes 150 of network 110 that is associated with trace identification 182. Trace data 186 may include flow statistics for each participating node 150 of network 110, an internal trace result for each packet associated with each participating node 150, and the like. In certain embodiments, orchestrator 140 may retrieve trace data 186 from the trace result database of each participating node 150. For example, orchestrator 140 may pull trace data 186 associated with trace identification 182 from the database records of the trace result databases. In certain embodiments, orchestrator 140 stores trace data 186 on one central database for correlation and visualization.

Trace data 186 may include two parts: per device per flow statistics with characteristics of that flow; and per device per packet internal processing trace results. Because a flow has a per trace unique flow identification, orchestrator 140 can correlate the same flow's statistics for multiple nodes 150. Orchestrator 140 may calculate an underlay network drop using the last hop sent count minus the next hop received count. Because the internal trace result for each upstream packet 160 and each downstream packet 170 includes a flow identification, orchestrator 140 can correlate the internal trace results with flow statistics and group the internal trace results by different flows, as illustrated in FIG. 3 below.

In certain embodiments, orchestrator generates trace report 188 using trace data 186 received from participating nodes 150 of network 110. Trace report 188 is an organized collection of information showing the results of the network path trace initiated by orchestrator 140. Trace report 188 may include information associated with a flow path (e.g., a unidirectional or bi-directional flow path) for application 124 that is generated by orchestrator 140. In certain embodiments, trace report 188 includes one or more of the following: a network path of each flow of the network path trace; a network location where each flow experienced packet drop; metrics associated with each flow; a total number of packets associated with each flow; a total number of bytes associated with each flow; a listing of the packets associated with each flow; and an internal trace result associated with each of the packets.

In certain embodiments, orchestrator 140 initiates a clean procedure for the trace result databases of nodes 150. Orchestrator 140 may initiate the clean procedure periodically, on-demand, and/or once trace data 186 is retrieved from nodes 150. In certain embodiments, each node 150 delays the cleaning of its trace result database until trace data 186 is successfully transported to orchestrator 140 so that if the connection between node 150 and orchestrator 140 fails, orchestrator 140 can still recover the trace results by scanning the trace result database of node 150 after the connection is restored.

In operation, user 120 of user device 122 experiences a performance issue (e.g., a slow response time, a poor video quality, etc.) with application 124 (e.g., Webex Meetings). Via user device 122, user 120 communicates (see step 1 of FIG. 1) a complaint about the performance of application 124 to operator device 132. The complaint includes trace parameters 180 such as a site identification, a VPN identification of user 120, an IP address of user device 122, an identification of application 124 that is experiencing performance issues, and the like. Operator 130 inputs trace parameters 180 into user interface 134 of operator device 132 and requests (see step 2 of FIG. 1) orchestrator 140 to start tracing application 124 by selecting a start function on user interface 134. Orchestrator 140 receives trace parameters 180 from operator device 132 and determines to initiate a network path trace for application 124. Orchestrator 140 allocates trace identification 182 to the network path trace and generates filter policy 184 for the network path trace using trace parameters 180. Orchestrator 140 binds trace identification 182 to filter policy 184 and initiates the network path trace within network 110 by communicating (see step 3 of FIG. 1) trace identification 182 and filter policy 184 to node 150a of network 110.

After the network path trace has been initiated (e.g., activated) within network 110, node 150a receives (see step 4 of FIG. 1) upstream packet 160 from user device 122. Node 150a matches upstream packet 160 to the filter of filter policy 184. Node 150a searches for an existing flow using the tuple of upstream packet 160. If no existing flow is discovered, node 150a creates a new flow entry and allocates a unique flow identification to the new flow. Node 150a traces the internal code path of upstream packet 160 and saves a trace result to a trace database stored on node 150a using trace identification 182, the flow identification, and the arriving order of upstream packet 160 as three levels of indexes.

When node 150a finishes processing upstream packet 160, node 150a adds metadata to the overlay encapsulation of upstream packet 160. The metadata includes the following fields: a direction bit, a debug level, a flag, a flow identification, and trace identification 182. Node 150a then communicates (see step 5 of FIG. 1) upstream packet 160 to node 150b. When node 150b of network 110 receives upstream packet 160, node 150b decapsulates the metadata and reads trace identification 182. Node 150b searches trace identification 182 in a trace result database. If node 150b does not discover a match, node 150b inserts trace identification 182 into its trace result database and communicates (see step 6 of FIG. 1) a notification to orchestrator 140 of network 110. The notification includes an identification of node 150b and trace identification 182. Orchestrator 140 uses the information in the notification to determine the network path flow of upstream packet 160.

Node 150b saves the trace result of upstream packet 160 in its trace result database and indexes trace identification 182 and the flow identification. Node 150b reads the arriving order of upstream packet 160 from the metadata. Node 150b searches for the existing flow using the tuple of upstream packet 160. If no existing flow entry is found, node 150b creates (see step 7 of FIG. 1) a new flow entry. The created flow entry may be bi-directional such that an automatic filter that matches the existing flow entries can be set up on the network domain edge interfaces to match downstream packets coming from outside the network domain. Trace identification 182 and the flow identification are saved into the flow entry opaque data.

When downstream packet 170 arrives (see step 8 of FIG. 1) at node 150b, node 150b determines that downstream packet 170 matches an existing flow using the automatic filter. Based on this determination, node 150b determines to trace downstream packet 170. Node 150b obtains trace identification 182 and the flow identification from the matching flow entry's opaque data and uses this information together with the arriving order of downstream packet 170 to index the internal trace result of downstream packet 170. The same trace identification 182 and flow identification are included in the metadata fields once downstream packet 170 proceeds to overlay encapsulation.

Downstream packet 170 is communicated (see step 9 of FIG. 1) back to node 150a with the same trace identification 182 and flow identification in the metadata and the direction bit in the metadata set to downstream. When node 150a receives downstream packet 170, node 150a determines that downstream packet 170 is downstream by reading the metadata. Node 150a traces (see step 10 of FIG. 1) downstream packet 170 and saves the trace results in its trace result database.

Steps 4 through 10 of FIG. 1 are repeated until operator 130 of operator device 132 communicates (see step 11 of FIG. 1) an end trace command to orchestrator 140. Once orchestrator 140 receives the end trace command, orchestrator 140 communicates (see step 12 of FIG. 1) a stop trace command for trace identification 182 to node 150a, node 150b, and any other nodes 150 that have a trace result database record for trace identification 182. Upon receiving the stop trace command, all filters (including those configured on node 150a and those automatically generated on node 150b) are removed so no new packets are matched and traced. Orchestrator 140 retrieves (see step 12 of FIG. 1) trace data 186 for trace identification 182 from the trace result database of each participating node 150 and stores trace data 186 on one central database for correlating and visualization. Orchestrator 140 generates trace report 188 for application 124 using trace data 186. Trace report 188 includes a flow path (e.g., a unidirectional or a bi-directional flow path) for application 124 within network 110. Orchestrator 140 communicates (see step 13 of FIG. 1) trace report 188 to user interface 134 of operator device 132. Orchestrator 140 initiates (see step 14 of FIG. 1) a clean procedure for the trace result databases on participating nodes 150. As such, system 100 utilizes orchestrator 140 to push filter policy 184 together with trace identification 182 to node 150a for on-demand tracing without the need to simulate forwarding decisions, which introduces minimal or no overhead to normal usage.

Although FIG. 1 describes and illustrates steps 1 through 14 as occurring in a particular order, this disclosure contemplates any suitable steps of FIG. 1 occurring in any suitable order. Furthermore, although this disclosure describes and illustrates particular components or devices carrying out steps 1 through 14 of FIG. 1, this disclosure contemplates any suitable combination of any suitable components and devices carrying out steps 1 through 14 of FIG. 1.

Although FIG. 1 illustrates a particular arrangement of network 110, user 120, user device 122, application 124, operator 130, operator device 132, user interface 134, orchestrator 140, nodes 150, upstream packet 160, downstream packet 170, trace parameters 180, trace identification 182, filter policy 184, trace data 186, and trace report 188, this disclosure contemplates any suitable arrangement of network 110, user 120, user device 122, application 124, operator 130, operator device 132, user interface 134, orchestrator 140, nodes 150, upstream packet 160, downstream packet 170, trace parameters 180, trace identification 182, filter policy 184, trace data 186, and trace report 188.

Although FIG. 1 illustrates a particular number of networks 110, users 120, user devices 122, applications 124, operators 130, operator devices 132, user interfaces 134, orchestrators 140, nodes 150, upstream packets 160, downstream packets 170, trace parameters 180, trace identifications 182, filter policies 184, trace data 186, and trace reports 188, this disclosure contemplates any suitable number of networks 110, users 120, user devices 122, applications 124, operators 130, operator devices 132, user interfaces 134, orchestrators 140, nodes 150, upstream packets 160, downstream packets 170, trace parameters 180, trace identifications 182, filter policies 184, trace data 186, and trace reports 188. For example, system 100 may include more than one filter policy 184 and/or more than two nodes 150.

FIG. 2 illustrates an example user interface page 200 for inputting trace parameters 180 that may be used by system 100 of FIG. 1. In certain embodiments, user interface page 200 is generated by user interface 134 of FIG. 1. Orchestrator 140 of FIG. 1 may provide user interface 134 to operator 130 to allow operator 130 to request a network path trace for an application (e.g., application 124 of FIG. 1). User interface page 200 includes trace parameters 180, advanced options 210, and historical tracing results 230.

Trace parameters 180 of user interface page 200 are characteristics associated with an application that are used to trace the application through network 110. In the illustrated embodiment of FIG. 2, trace parameters 180 are included at the top of user interface page 200. Trace parameters 180 include a site identification (represented as Site ID), a VPN identification of the complaining user (represented as VPN), an IP address of the complaining user's device (represented as Host IP), a destination IP address (represented as Destination IP/FQDN), an identification of the application (represented as Application), and a duration for the network path trace (represented as Trace Duration). The site identification indicates the location of user device 122 relative to a network. For example, the site identification may be a unique identifier of a site in an SD-WAN overlay network. The VPN identification is the VPN identification of the complaining user. While the trace duration is represented as seconds in FIG. 2, the trace duration may be represented in any increment of time (e.g., milliseconds, minutes, etc.). In certain embodiments, the trace duration of FIG. 2 may be replaced with a number of packets such that the network path trace terminates once the number of packets input in user interface page 200 are filtered in accordance with a filter policy. Trace parameters 180 may be represented by numerals, letters, characters, or a combination thereof. In certain embodiments, an asterisk located next to a particular trace parameter 180 (i.e., the site identification and the VPN identification) indicates that this field is mandatory to initiate a network path trace.

Advanced options 210 of user interface page 200 are characteristics associated with the node (e.g., node 150a of FIG. 1) of the network that is closest to the complaining user. Advanced options 210 include a device identification, a source interface, a protocol, a source port, a destination port, a Differentiated Services Code Point (DSCP), and a debug level. The debug level may include the following drop-down selections: choose/reset selections, trace all packets, trace drop packets only, and trace statistics only. A Feature Invocation Array (FIA) trace feature (represented as FIA Trace in FIG. 2) may be selected to track every feature entry invoked during packet processing. A packet copy capability (represented as Packet Copy in FIG. 2) may be selected to copy input and output packets at various layers of the packet.

Historical tracing results 230 of user interface page 200 are past trace reports (e.g., trace report 188 of FIG. 1) generated by a network orchestrator. Historical tracing results 230 may include a time that each trace report was generated, trace parameters 180 associated with each respective trace report (e.g., the VPN identification, the site identification, the IP address of the complaining user's device, the destination IP address, the application identification, and the trace duration). Historical tracing results 230 also include a link to each listed trace report.

Once the operator has input trace parameters 180 into user interface page 200, the operator may select a start function (represented as Start in FIG. 2) on user interface page 200, which communicates a request to the network orchestrator to start the network path trace for the application. In certain embodiments, the operator may select a stop function (represented as Stop in FIG. 2) on user interface page 200, which communicates an end trace command to the network orchestrator. Once the network orchestrator has completed the network path trace for the application in accordance with trace parameters 180, the network orchestrator may communicate a trace report to the operator, as illustrated in FIG. 3 below.

FIG. 3 illustrates an example user interface page 300 for displaying trace report 188 that may be used by system 100 of FIG. 1. User interface page 300 includes trace parameters 180 and/or advanced options 210 from user interface page 200 of FIG. 2 and trace report 188 that has been generated by the network orchestrator in response to the operator requesting the network path trace for the application associated with trace parameters 180. Trace report 188 of user interface page 300 summarizes the trace results for the network path trace. In the illustrated embodiment of FIG. 3, trace report 188 includes twelve columns: A Global Flow column, a Local Edge column, a Local Color column, a Remote Edge column, a Remote Color column, a Local Drop Rate column, a WAN Drop Rate column, a Remote Drop Rate column, a Jitter column, a Latency column, a Total Packets column, and a Total Bytes column.

The first five columns (the Global Flow column, the Local Edge column, the Local Color column, the Remote Edge column, and the Remote Color column) of trace report 188 may be used by the network operator to identify the network path of each flow in each direction. The Global Flow column indicates the flow identifications (e.g., Flow ID 1, Flow ID 87, Flow ID 235, and Flow ID 4213) associated with the network path trace, a protocol (e.g., Transmission Control Protocol (TCP), User Datagram Protocol (UDP), etc.) associated with each flow identification, and the number of upstream and downstream hops for each flow identification. The Local Edge column identifies the local edge node (e.g., vm5, vm1, etc.) associated with each hop of each flow, the Local Color column identifies the type of network (e.g., LTE, 3g, etc.) used by the local edge node, the Remote Edge column identifies the remote edge node (e.g., vm1, vm5, etc.) associated with each hop of each flow, and the Remote Color column identifies the type of network (e.g., LTE, 3g, etc.) used by the remote edge node. By interpreting these five columns, the network operator can discover any asymmetric routing issues experienced by the application.

The next three columns (the Local Drop Rate column, the WAN Drop Rate column, and the Remote Drop Rate column) of trace report 188 may be used by the network operator to identify a location in the network where a particular flow is suffering from packet drop. The Local Drop Rate column indicates the percentage of packets dropped by the local edge node, the WAN Drop Rate column indicates the percentage of packets dropped by WAN (e.g., the Internet) and the Remote Drop Rate column indicates the percentage of packets dropped by the remote edge node.

The next two columns (the Jitter column and the Latency column) of trace report 188 indicate the metrics of each particular flow. The Jitter column indicates the jitter (i.e., the variation in latency of packets carrying voice or video data over a communications channel) experienced by each hop of each flow, as measured in milliseconds. The Latency column indicates the latency (i.e., the time for a data packet to travel from one designated point to another) experienced by each hop of each flow, as measured in milliseconds. While user interface page 300 displays the jitter and latency metrics in units of milliseconds, user interface page 300 may display the jitter and latency metrics in any suitable unit (e.g., microseconds, seconds, etc.).

The last two columns (the Total Packets column and the Total Bytes column) of trace report 188 indicate the total number of packets and bytes associated with each flow. The Total packets column indicates the total number of packets communicated in each hop of each flow, and the Total Bytes column indicates the total number of bytes, as measured in kilobytes, in each hop of each flow. Filters are available on user interface page 300 to filter interested flows by their characteristics. After the network operator reviews user interface page 300 generated from flow statistics data, the network operator may press a detail button (represented as Detail in FIG. 3) that is located next to the name of each node (e.g., vm1, vm5, etc.) to view the packet detail of a particular flow. An example packet detail is illustrated in FIG. 4 below.

FIG. 4 illustrates an example user interface page 400 for displaying details of trace report 188 of FIG. 3. User interface page 400 includes trace parameters 180 and/or advanced options 210 from user interface page 200 of FIG. 2 and details of trace report 188 that is summarized on user interface page 300 in FIG. 3. In the illustrated embodiment of FIG. 4, trace report 188 includes eight columns: A Flows column, an Input column, an Output column, a State column, a Reason column, an SLA Class column, a Fwd Class column, and a QoS Queue column.

The Flows column of trace report 188 displays a list of packets (packet 23, packet 36, packet 52, packet 67, packet 82, packet 95, packet 109, and packet 123) of a flow (flow identification 87) on one selected device (vm5). The Input column of trace report 188 identifies the input interface associated with each packet, and the Output column of trace report 188 identifies the output interface associated with each packet. If the packet has been dropped by the selected device, the output interface is set to none (represented as <none> in FIG. 4). The State column of trace report 188 indicates whether each packet has been dropped (represented as DROP in FIG. 4) or forwarded (represented as FWD in FIG. 4). The Reason column of trace report 188 indicates the reason for the drop (e.g., a tail drop), the SLA Class column of trace report 188 indicates the service-level agreement (SLA) class associated with the packet, the Fwd Class column of trace report 188 indicates the priority of the packet, and the QoS Queue column of trace report 188 indicates the number of outbound queues for all ports on the device.

In certain embodiments, a network operator may select a feature to view more details associated with each packet. For example, the network operator may click on the "click for more detail" button beside packet 23, which displays a packet trace detail (e.g., an internal trace result) of packet 23 on the right-hand side of user interface page 400. The packet trace detail may include a summary of the packet trace (e.g., the input interface identification, the output interface identification (if applicable), the state of the packet, the reason for the packet drop (if applicable), a timestamp showing the start and stop time of the packet trace, etc.), path trace information, FIA trace information, and packet copy information. The path trace information may include a feature of the packet (e.g., IPv4), the input interface identification, the output interface identification (if known), the source of the packet (e.g., a source IP address), the destination of the packet (e.g., a destination IP address), a protocol used by the packet (e.g., TCP, UDP, etc.), a source port associated with the packet, a destination port associated with the packet, and the like. By reading the device's internal trace result, the operator can determine a code level understanding of how packet 23 was handled on the vm5 device. In certain embodiments, filters are available on user interface page 400 to filter packets by their characteristics.

FIG. 5 illustrates an example method 500 for determining a network path trace for an application. Method 500 begins at step 505. At step 510, a network orchestrator (e.g., orchestrator 140 of FIG. 1) receives trace parameters (e.g., trace parameters 180) from a user device (e.g., user device 122 of FIG. 1). For example, a user may experience a performance issue with an application (e.g., application 124 of FIG. 1) and communicate, via a user device, a complaint about the performance of the application to an operator (e.g., operator 130 of FIG. 1). The complaint may include trace parameters such as a site identification, a VPN identification of the user, an IP address of the user device, an identification of the application that is experiencing performance issues, and the like. The operator may input the trace parameters into a user interface (e.g., user interface 134 of operator device 132) and request the network orchestrator to start tracing the application by selecting a start function on a user interface page (e.g., user interface page 200 of FIG. 2). Method 500 then moves from step 510 to step 515.

At step 515 of method 500, the network orchestrator determines to initiate a network path trace for the application that is experiencing the performance issues. The network orchestrator may determine to initiate the network path trace in response to receiving the trace parameters from the operator device. Method 500 then moves from step 515 to step 520, where the orchestrator generates a filter policy (e.g., filter policy 184) for the network path trace using trace parameters 180. The filter policy instructs one or more network nodes to filter all packets received from the complaining user's device. Method 500 then moves from step 520 to step 525, where the network orchestrator allocates a trace identification (e.g., trace identification 182 of FIG. 1) to the network path trace. In certain embodiments, the network orchestrator may bind the trace identification to the filter policy. Method 500 then moves from step 525 to step 530.

At step 530 of method 500, the network orchestrator initiates the network path trace within the network by communicating the trace identification and the filter policy to a first node (e.g., node 150a of FIG. 1) of the network that is located closest to the complaining user's device. Upon receiving the filter policy from the orchestrator, the first node begins filtering upstream packets (e.g., upstream packet 160 of FIG. 1) received from the complaining user's device. If the first node does not locate an existing flow for each upstream packet in its trace result database, the first node creates a new flow entry and allocates a unique flow identification to the new flow. The first node traces the internal code path of each upstream packet and saves a trace result using the trace identification, the flow identification, and the arriving order of the upstream packet as three levels of indexes.

When the first node finishes processing each upstream packet 160, the first node adds metadata to the overlay encapsulation of each upstream packet and communicates the upstream packets to a second node of the network. When the second node receives the upstream packets, the second node decapsulates the metadata, reads the trace identification, and searches for the trace identification in its trace result database. Method 500 then moves from step 530 to step 535.

At step 535 of method 500, the network orchestrator receives notifications from one or more nodes of the network. For example, if the second node does not locate a match for the trace identification in its trace result database, the second node inserts the trace identification into the trace result database and communicates a notification to the network orchestrator. The notification sent to the network orchestrator includes an identification of the second node and the trace identification.

The second node saves the trace result of each upstream packet, reads the arriving order of each upstream packet from the metadata, and searches for the existing flow in its database. If no existing flow entry is found, the second node creates a new flow entry. The created flow entry may be bi-directional such that an automatic filter that matches the existing flow entries can be set up on the network domain edge interfaces to match downstream packets (e.g., downstream packet 170 of FIG. 1) coming from outside of this network domain. The trace identification and the flow identification are saved into the flow entry opaque data. Method 500 then moves from step 535 to step 540.

At step 540 of method 500, the network orchestrator determines whether an end trace command has been received. For example, the network operator may communicate an end trace command to the orchestrator by selecting a stop function on a user interface page (e.g., user interface page 200 of FIG. 2). If the network orchestrator has not received an end trace command, method 500 repeats step 535 and step 540 until the end trace command is received. Once the network orchestrator receives the end trace command, method 500 moves from step 540 to step 545, where the network orchestrator communicates a stop trace command for the trace identification to the plurality of network nodes that have a trace result database record for that particular trace identification. Upon receiving the stop trace command, all filters (including those configured on the first node and those automatically generated on the second node) are removed so no new packets are matched and traced. The network orchestrator retrieves trace data (e.g., trace data 186 of FIG. 1) for the trace identification from the trace result database of each participating network node. Method 500 then moves from step 545 to step 550.

At step 550 of method 500, the network orchestrator generates a trace report (e.g., trace report 188 of FIG. 1) for the traced application using the trace data received from the participating network nodes. The trace report includes a flow path (e.g., a unidirectional or a bi-directional flow path) for the application. The trace report may be communicated to the user interface of the operator's device and displayed on one or more user interface pages. For example, a summary of the trace report may be displayed on a user interface page (e.g., user interface page 300 of FIG. 3). As another example, specific details of the summarized trace report may be displayed on a user interface page (e.g., user interface page 400 of FIG. 4). Method 500 then moves from step 550 to step 555, where method 500 ends.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for determining a network path trace including the particular steps of the method of FIG. 5, this disclosure contemplates any suitable method for determining a network path trace for an application including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below, in particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM), Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated. Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular

What is claimed is:

1. A network element, comprising:
one or more processors; and
one or more computer-readable non-transitory storage media coupled to the one or more processors and comprising instructions that, when executed by the one or more processors, cause the network element to perform operations comprising:
allocating a trace identification to a network path trace;
binding the trace identification to a filter policy;
initiating the network path trace within a network by communicating the filter policy and the trace identification to a first node of the network;
receiving network path trace data from a plurality of nodes of the network, wherein:
the plurality of nodes of the network comprises the first node; and
the network path trace data comprises one or more flow identifications; and
generating a trace report for the application using the network path trace data.

2. The network element of claim 1, wherein the trace report comprises a bi-directional flow path within the network.

3. The network element of claim 1, the operations further comprising generating the filter policy for the network path trace using trace parameters, wherein the trace parameters comprise at least two selected from the group of:
a site identification;
a virtual private network (VPN) identification;
an Internet Protocol (IP) address of the user device; and
an identification of the application.

4. The network element of claim 1, wherein:
the trace identification is communicated from the first node of the network to a second node of the network within metadata of a packet; and
the metadata further comprises at least one selected from the group of:
an indication of a flow direction of the packet;
a debug level for the network path trace data; and
a flow identification allocated by the first node.

5. The network element of claim 1, wherein the trace report further comprises at least one selected from the group of:
a network path of each flow of the network path trace;
a network location where each flow experienced packet drop;
metrics associated with each flow;
a total number of packets associated with each flow;
a total number of bytes associated with each flow;
a listing of the packets associated with each flow; and
an internal trace result associated with each of the packets.

6. The network element of claim 1, the operations further comprising:
receiving an end trace command; and
communicating, in response to receiving the end trace command, a stop trace command for the network path trace to the plurality of nodes of the network.

7. The network element of claim 1, wherein the network path trace data comprises:
flow statistics for each of the plurality of nodes of the network; and
an internal trace result for each packet associated with each of the plurality of nodes.

8. A method, comprising:
allocating a trace identification to a network path trace;
binding the trace identification to a filter policy;
initiating the network path trace within a network by communicating the filter policy and the trace identification to a first node of the network;
receiving network path trace data from a plurality of nodes of the network, wherein:
the plurality of nodes of the network comprises the first node; and
the network path trace data comprises one or more flow identifications; and
generating a trace report for the application using the network path trace data.

9. The method of claim 8, wherein the trace report comprises a bi-directional flow path within the network.

10. The method of claim 8, further comprising generating the filter policy for the network path trace using trace parameters, wherein the trace parameters comprise at least two selected from the group of:
a site identification;
a virtual private network (VPN) identification;
an Internet Protocol (IP) address of the user device; and
an identification of the application.

11. The method of claim 8, wherein:
the trace identification is communicated from the first node of the network to a second node of the network within metadata of a packet; and
the metadata further comprises at least one selected from the group of:
an indication of a flow direction of the packet;
a debug level for the network path trace data; and
a flow identification allocated by the first node.

12. The method of claim 8, wherein the trace report further comprises at least one selected from the group of:
a network path of each flow of the network path trace;
a network location where each flow experienced packet drop;
metrics associated with each flow;
a total number of packets associated with each flow;
a total number of bytes associated with each flow;
a listing of the packets associated with each flow; and
an internal trace result associated with each of the packets.

13. The method of claim 8, further comprising:
receiving an end trace command; and
communicating, in response to receiving the end trace command, a stop trace command for the network path trace to the plurality of nodes of the network.

14. The method of claim 8, wherein the network path trace data comprises:
flow statistics for each of the plurality of nodes of the network; and
an internal trace result for each packet associated with each of the plurality of nodes.

15. One or more computer-readable non-transitory storage media embodying instructions that, when executed by a processor, cause the processor to perform operations comprising:
allocating a trace identification to a network path trace;
binding the trace identification to a filter policy;
initiating the network path trace within a network by communicating the filter policy and the trace identification to a first node of the network;
receiving network path trace data from a plurality of nodes of the network, wherein:
the plurality of nodes of the network comprises the first node; and the network path trace data comprises one or more flow identifications; and generating a trace report for the application using the network path trace data.

16. The one or more computer-readable non-transitory storage media of claim 15, wherein the trace report comprises a bi-directional flow path within the network.

17. The one or more computer-readable non-transitory storage media of claim 15, the operations further comprising generating the filter policy for the network path trace using trace parameters, wherein the trace parameters comprise at least two selected from the group of:
a site identification;
a virtual private network (VPN) identification;
an Internet Protocol (IP) address of the user device; and
an identification of the application.

18. The one or more computer-readable non-transitory storage media of claim 15, wherein:
the trace identification is communicated from the first node of the network to a second node of the network within metadata of a packet; and
the metadata further comprises at least one selected from the group of:
an indication of a flow direction of the packet;
a debug level for the network path trace data; and
a flow identification allocated by the first node.

19. The one or more computer-readable non-transitory storage media of claim 15, wherein the trace report further comprises at least one selected from the group of:
a network path of each flow of the network path trace;
a network location where each flow experienced packet drop;
metrics associated with each flow;
a total number of packets associated with each flow;
a total number of bytes associated with each flow;
a listing of the packets associated with each flow; and
an internal trace result associated with each of the packets.

20. The one or more computer-readable non-transitory storage media of claim 15, the operations further comprising:
receiving an end trace command; and
communicating, in response to receiving the end trace command, a stop trace command for the network path trace to the plurality of nodes of the network.

* * * * *